Dec. 12, 1950     J. G. CAPSTAFF     2,533,424
METHOD AND APPARATUS FOR STRIPPING MULTILAYER FILM
Filed July 13, 1946
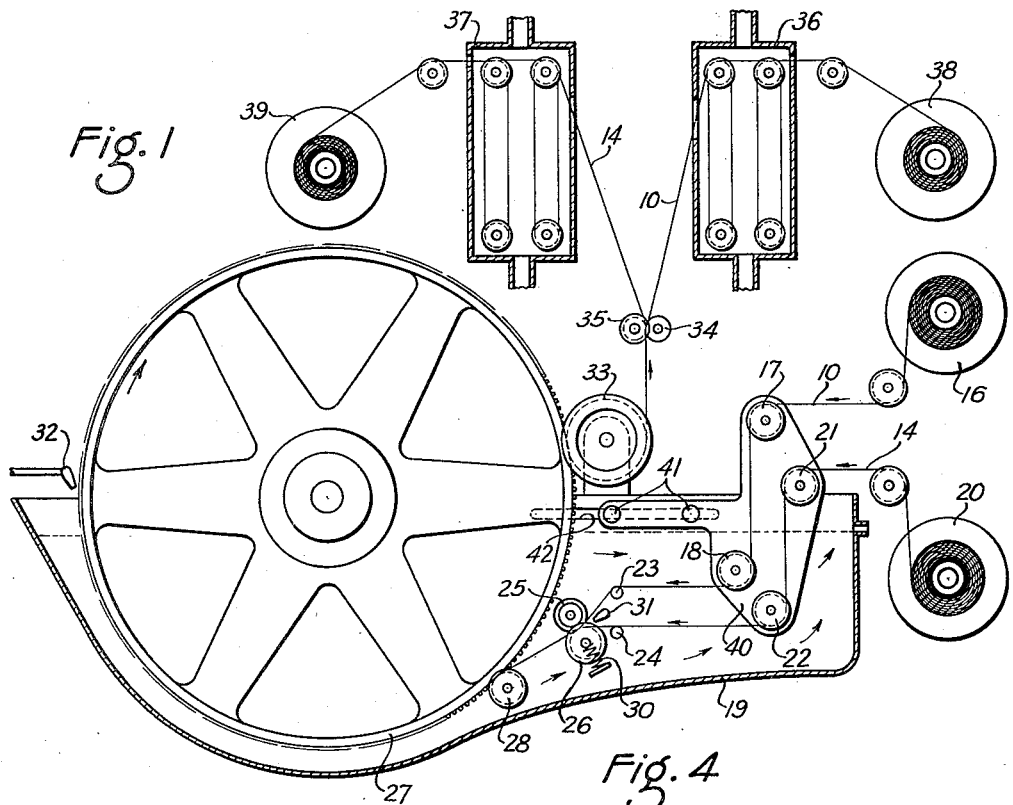
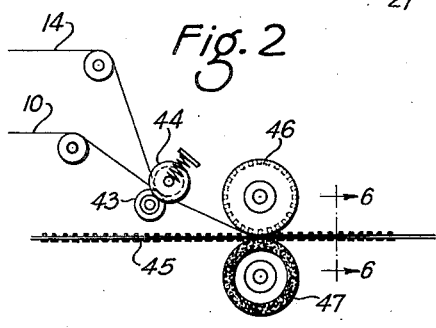
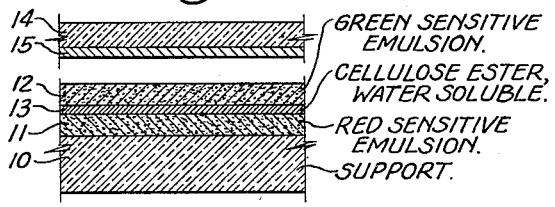
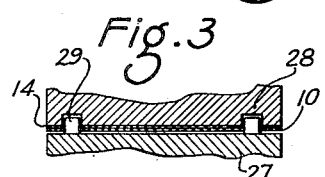
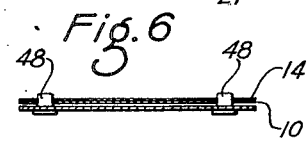
John G. Capstaff
INVENTOR
BY *Ulotm M Perrins*
*Rolla N. Carter*
ATTORNEYS Patented Dec. 12, 1950

2,533,424

UNITED STATES PATENT OFFICE 2,533,424

METHOD AND APPARATUS FOR STRIPPING MULTILAYER FILM

John G. Capstaff, Rochester, N. Y., assignor to Eastman Kodak Company, Rochester, N. Y., a corporation of New Jersey Application July 13, 1946, Serial No. 683,439

4 Claims. (Cl. 154—37)

This invention relates to motion picture photography and more particularly to the transferring of an exposed emulsion layer from a multilayer motion picture film to a new support. More specifically, the invention is directed to the bonding of an emulsion layer in registration on its new support without mechanical injury or other abuse which will manifest itself in later stages of the process.

In motion picture photography involving the bringing of two perforated films into intimate contact and in substantially exact registration, it is customary to feed the two films at separate points onto a suitable registering means having teeth corresponding to the perforations of the films and after the films are engaged by the teeth to press them into firm contact as required by the process. This pressing together or rolldown of the two films simultaneously with or after their being seated on the registering means is unreliable, mainly because of inequalities in the carrier means, and when exposed but undeveloped emulsion layers are involved, pressure imprints frequently occur which lend an undesirable appearance to the end product.

The primary object of the present invention is the provision of a method and apparatus whereby the roll-down of the two films is unaffected by inequalities in the registering means.

Other objects and advantages of the invention will be apparent from the following description when read in connection with the accompanying drawing in which:

Fig. 1 shows diagrammatically one form of apparatus suitable for practising the invention;

Fig. 2 shows diagrammatically a modified form of apparatus;

Fig. 3 is an enlarged partial view in section showing the seating of films onto the registering carrier of the apparatus of either Fig. 1 or Fig. 2;

Fig. 4 shows in enlarged cross-section the appearance of a two layer stripping film and the separate base to which the outer layer is to be transferred;

Fig. 5 is a sectional view of the color-component records obtained by such transfer; and Fig. 6 is a section on line 6 of Fig. 2.

One type of multilayer film suitable for practising the invention is illustrated in Fig. 4 as comprising a two-emulsion layer multilayer film which may be constructed as described in Patent No. 2,367,665, Capstaff et al. The film employed in actual practice will usually have three emulsion layers, the outer two of which are adapted to be stripped in transferring them to new supports, all as fully described in said Capstaff patent. However, since the method and apparatus of the invention function the same regardless of the number of layers to be stripped, the following description will for simplicity be confined to the transferring of one emulsion layer from a multilayer film to a new support.

The multilayer film as shown in Fig. 4 comprises an ordinary base 10 with two emulsion layers 11 and 12, the layer 11 being permanently mounted on the base 10 in the usual way and the layer 12 being mounted on the layer 11 with a stripping layer 13 which preferably is a water soluble adhesive such as a water soluble cellulose ester. However, it will be understood that the invention is indifferent to the particular structure of the multilayer film. As shown in Fig. 4, a separate support or base to which the outer emulsion layer 12 is to be transferred may comprise an ordinary motion picture film base 14 having a suitable subbed layer 15 to which a moistened gelatin layer will adhere. It is to be understood that the two films 10 and 14 carry identical perforations.

Thus, for example, in forming two separate color-component films, the multilayer film 10 after exposure but before development is immersed in plain water at normal temperature, say 60° F. to 75° F. for a predetermined time to weaken the stripping layer 13 and to render the outer emulsion layer 12 tacky so that when the emulsion layer 12 is squeegeed under water to the subbed base 14 and has been given a suitable bonding time, the emulsion layer 12 will stay with the new support 14 when the two films 10 and 14 are separated.

Heretofore, the above known procedure has been carried out in the following manner: the exposed multilayer film 10, while immersed in water, was fed onto the registering teeth of an endless carrier after which the new support 14 was fed onto the registering teeth in superposed relation to the film 10 and the two films pressed (rolled-down) firmly together between a pressure socket roller and the back of the endless carrier. The two films thus traveled together until the outer emulsion layer 12 was firmly bonded to the new support 14 and were then separated at the stripping layer 13. This roll-down of the multilayer film and the new support separately on the endless carrier abused the emulsion layers so that pressure defects resulted even when a hardener was added to the immersion tank.

In accordance with the present invention, greatly improved results are obtained by rolling down the two submerged films into intimate contact immediately before they reach the registering teeth. This apparently simple albeit radical change or modification of the known procedure produces superior results and eliminates both the pressure defects and the need for a hardener in the immersion tank.

In the apparatus diagrammatically illustrated in Fig. 1, the exposed multilayer film 10 is drawn from a film supply roll 16 and around flanged rollers 17 and 18 into a tank 19 containing water to a depth indicated by a dash line. Similarly, the subbed film 14 is drawn from a supply roll 20, and around flanged rollers 21 and 22 to immerse it in the water in the tank 19. The two films 10 and 14 are guided by rollers 23 and 24, respectively, to pass between a pair of pressure rollers 25 and 26 at least one of which is preferably rubber covered and thence to an endless registering carrier here shown as a sprocket wheel 27. The two films 10 and 14, being in intimate contact, are fed as a unit onto the teeth 29 of the sprocket wheel 27 by means of a socket roller 28 which serves to seat the perforated films on the teeth 29 but does not press them against the surface of the sprocket wheel 27 (see Fig. 3). The sprocket wheel 27 is driven and thus pulls the films 10 and 14 from the supply rolls 16 and 20 and through the above described paths. The socket roller 28 in seating the perforations of the films 10 and 14 onto the accurately made teeth 29 of the sprocket wheel 27 insures exact register of the two films 10 and 14. The two films 10 and 14 are only in approximate register when they are squeegeed together by the roll-down action of the pressure rollers 25 and 26. During the passage of the films from these rollers to the registering pins, they remain slidable one over the other so that exact register can take place on the pins.

It is desirable to keep the film path between the point of roll-down and the seating on the registering teeth 29 as short as is feasible, and I have found that a path length of approximately four inches is entirely satisfactory at a film travel of 40 to 60 feet per minute. The angle of approach of the two films to the endless carrier 27 should be as small as is practicable to avoid undue flexing of the films. To prevent buckle of the films under the socket roller 28, it is very important that one of the roll-down rollers 25 and 26 be accurately flanged for lateral guidance of the films. As shown, the roller 25 is rubber covered and the roller 26 is flanged. Roll-down pressure is provided by a suitable spring 30 arranged to urge the roller 26 towards the rubber covered roller 25. Obviously, the spring 30 may be applied to the roller 25. Lateral guiding is improved by causing the films to contact an arc, say 30°, of the periphery of the flanged roller 26. There must be sufficient back tension on the films to enable them to slip for registry as stated above.

To insure cleanliness and absence of air bubbles, it is preferred to inject filtered water as by a jet 31 between the films 10 and 14 just before they are rolled down. Additional jets or cleaning means may be provided as desired for well known purposes such as circulating the water against the movement of the films.

The two films 10 and 14 which should have similar shrinkage and swelling characteristics arrive at the roll-down point, the rollers 25 and 26, in condition to adhere together, i. e., the emulsion layer 12 of the film 10 has become tacky enough to stick to the subbed surface 15 of the film 14, and in passing between the rollers 25 and 26 will be pressed together in intimate contact and with enough force to insure removal of all excess water, about seven pounds pressure being adequate for the above identified films. After roll-down, the two films are seated on the teeth 29 by the socket roller 28 and continue around the sprocket wheel 27 and out of the tank 19 to a point where air from a jet 32 blows off excess surface liquid and then around the wheel 27 to a flanged roller 33 which removes the films from the sprocket wheel 27 and directs them between guide rollers 34 and 35, one of which is preferably flanged. As the films 10 and 14 emerge from the rollers 34 and 35, they are separated and passed, respectively, through drying chambers 36 and 37 to take-up reels 38 and 39. The two films 10 and 14 separate at the stripping layer 13 which has been greatly weakened by action of water during its passage from roller 18 to the point of separation. On the other hand, the bond between the emulsion layer 12 and the film 14 has strengthened and separation consistently takes place in the stripping layer 13. Thus, the films 10 and 14 after separation have a single emulsion layer as shown in Fig. 5 and may be further processed separately as desired.

The wetting and bonding times for any particular film depend on the thickness, permeability and other physical characteristics of the layers 12 and 13 and normally would be determined experimentally. When using the films shown in Fig. 4, satisfactory stripping takes place with a wetting time of ten seconds prior to roll-down and sixty seconds or longer between roll-down and separation, all at 72° F. The overall time is determined by the speed of rotation of the sprocket wheel 27 and the time of wetting is accurately regulated by altering the length of the underwater path to the roll-down rollers 25 and 26. To this end the rollers 17, 18, 21 and 22 may be mounted on a bracket 40 which can be secured by studs 41 at any position in a horizontal slot 42, provided in the tank 19.

Instead of using a large sprocket wheel as the endless carrier, a pin-belt of suitable length may be employed to practice the invention if arranged as illustrated in Fig. 2. In this arrangement, the two films 10 and 14 while immersed in water are passed between roll-down rollers 43 and 44 immediately prior to their being seated on the registering pins of a pin-belt 45 by means of a socket roller 46 and a rubber covered backing roller 47. As was the case in the apparatus of Fig. 1, the roller 44 is accurately flanged and spring pressed towards the rubber covered roller 43 so as to roll-down the two films 10 and 14 into intimate contact. Also, the rollers 46 and 47 are so positioned that they seat the combined films on the registering pins without pressing them against the belt carrying the pins. The result is shown in Fig. 6 which is an enlarged section along line 6—6 in Fig. 2.

As best seen in Fig. 6, the pin-belt 45 comprises a flexible metal band along the margins of which are mounted rows of register pins or teeth 48 adapted to fit into the perforations of the films. Pin-belt machines are well known and anyone familiar with Patent No. 2,369,176 and the patents cited therein will readily understand the application of Fig. 2 thereto to carry out the process described in connection with Fig. 1. Here the pin-belt 45 pulls the films 10 and 14 between the roll-down rollers 43 and 44 and the exact registration of the films on the pin-belt 45 takes place as described in connection with Fig. 1.

Although the invention has been described in detail with reference to the transferring of a single layer to a separate support, it is obvious that as many layers as desired may be so transferred in succession, it being necessary merely to choose a wetting time or wetting agent proper for weakening the adhesive layer involved to permit satisfactory stripping.

I claim:

1. In a machine for transferring in accurate register an emulsion layer from a perforated multilayer motion picture film to a similarly perforated blank film, an endless carrier having a surface provided with pins for engaging and registering perforations in the films and advancing the films in registered relationship, means for pressing the two films into intimate contact as they approach said carrier, and means for seating the contacting films onto the pins in the surface of said carrier, said seating means comprising a roller having its surface spaced from said pin containing surface by a distance which is greater than the combined thickness of the two films but less than the height of said pins so as to accomplish said seating.

2. In the art of motion picture photography in which the respective layers of a perforated multilayer film are exposed to different color aspects and the outer layers transferred to separate perforated supports to provide when developed a set of color separation films, the method of transferring the outer layer to a support which comprises first wetting the outer layer to render it tacky, pressing such layer to a support under water, then engaging the perforations of the combined films with register teeth, maintaining the films in contact until bonded together and thereafter stripping the support and its bonded layer from the multilayer film.

3. In the art of motion picture photography in which the respective layers of a perforated multilayer film are exposed to different color aspects and the outer layers transferred in register to separate perforated supports to provide when developed a set of color separation films, the method of transferring the outer layer to a perforated support which comprises rendering the outer layer tacky, pressing the perforated support into firm contact with the tacky outer layer of the film and thereafter and while the outer layer is still tacky registering the perforations of the combined films.

4. In the process of transferring an emulsion layer from an accurately perforated multilayer film strip to a similarly perforated support strip wherein the strips are accurately registered by means of accurately formed registration teeth and held in contact until the outer layer of the multilayer strip is bonded to the support layer, the improved steps which comprise passing the two strips separately through a water bath, pressing them together while wet at a point spaced from the registration teeth and prior to the engagement of either with the registration teeth and then simultaneously engaging the two films with the registration teeth while they are in intimate contact.

JOHN G. CAPSTAFF.

REFERENCES CITED

The following references are of record in the file of this patent:

UNITED STATES PATENTS

| Number | Name | Date |
| --- | --- | --- |
| 1,381,840 | Jeapes | June 14, 1921 |
| 1,661,157 | Ball et al. | Mar. 6, 1928 |
| 1,682,979 | Oiler | Sept. 4, 1928 |
| 1,951,299 | Wagner | Mar. 13, 1934 |
| 2,019,260 | Howell | Oct. 29, 1935 |
| 2,271,572 | Rackett | Feb. 3, 1942 |
| 2,369,176 | Rackett | Feb. 13, 1945 |
| 2,415,442 | Rackett | Feb. 11, 1947 |